United States Patent [19]

Obuchi

[11] Patent Number: 5,819,227
[45] Date of Patent: Oct. 6, 1998

[54] TOUR SCHEDULE PROCESSOR FOR MOVING BODIES

[75] Inventor: Masashi Obuchi, Susono, Japan

[73] Assignee: Toyota Jidosha Kabushiki Kaisha, Toyota, Japan

[21] Appl. No.: 691,140

[22] Filed: Aug. 1, 1996

[51] Int. Cl.⁶ .......................... G08G 1/096; G06F 15/163
[52] U.S. Cl. ..................... 705/1; 705/1; 705/6; 364/436; 370/95.1; 701/117
[58] Field of Search ........................... 705/1, 6; 364/436; 370/95.1

[56] References Cited

U.S. PATENT DOCUMENTS

| | | | |
|---|---|---|---|
| 5,122,959 | 6/1992 | Matheson et al. | 364/436 |
| 5,157,660 | 10/1992 | Kuwahara et al. | 370/95.1 |
| 5,270,936 | 12/1993 | Fukushima et al. | 364/444 |
| 5,623,413 | 4/1997 | Matheson et al. | 364/436 |

FOREIGN PATENT DOCUMENTS

| | | | |
|---|---|---|---|
| 2721738 | 12/1995 | France | G08G 1/0968 |
| 2726382 | 5/1996 | France | G06F 15/63 |
| 3445668 | 1/1986 | Germany | G06F 15/50 |
| 5-89399 | 4/1993 | Japan | G08G 1/09 |
| 5-289997 | 11/1993 | Japan | G06F 15/02 |

OTHER PUBLICATIONS

Patent Abstracts of Japan, vol. 95, No. 11, Aug. 1995 re JP 07-229752.
Patent Abstracts of Japan, vol. 95, No 4, Jan. 1995 re JP 07-029099.
Patent Abstracts of Japan, vol. 18, No. 36 (P-1678) Oct. 1993 re JP 05-265376.

*Primary Examiner*—Allen R. MacDonald
*Assistant Examiner*—Jagdish Patel
*Attorney, Agent, or Firm*—Cushman Darby & Cushman IP Group of Pillsbury Madison & Sutro

[57] ABSTRACT

A tour schedule processor stores a tour schedule, in which a variety of transportation means are used, in a vehicle-installed data terminal and a personal digital assistant (PDA) such as a palm top computer, and enable the tour schedule to be carried out. A center console of a vehicle has a recess for receiving the PDA which retains the tour schedule. A data processor in the PDA transmits the tour schedule to a data processor in the vehicle-installed data terminal, which extracts and retains data related to the vehicle from the tour schedule. When a current position denotes transportation by the vehicle, a navigation unit of the vehicle-installed data terminal guides the vehicle. At the end of the guidance, the data processor of the vehicle-installed data terminal starts the PDA. The PDA then performs guidance. The PDA is removed from the recess, and guides the driver who is carrying the PDA.

9 Claims, 11 Drawing Sheets

| DATE | TIME | LOCATION | TRANSPORT MEANS | REMARKS |
|---|---|---|---|---|
| 95.6.6 | 8:00 | HOME | ↓ VEHICLE | |
| 95.6.6 | 8:30 | ○○IC | ↓ VEHICLE | |
| 95.6.6 | 9:30 | ○○SA | ↓ VEHICLE | BREAK |
| 95.6.6 | 10:00 | ○○IC | ↓ VEHICLE | |
| 95.6.6 | 10:30 | ○○STATION PARKING LOT | ↓ WALKING | |
| 95.6.6 | 11:00 | △△TEMPLE | ↓ WALKING | |
| 95.6.6 | 12:00 | ××RESTAURANT | ↓ BUS | MEAL |
| 95.6.6 | 14:00 | ○○PARKING LOT | ↓ VEHICLE | |
| 95.6.6 | 14:30 | ○○IC | ↓ VEHICLE | |
| 95.6.6 | 15:00 | ○○SA | ↓ VEHICLE | BREAK |
| 95.6.6 | 16:00 | ○○IC | ↓ VEHICLE | |
| 95.6.6 | 16:30 | HOME | | |

TOUR SCHEDULE PROCESSOR FOR MOVING BODIES

BACKGROUND OF THE INVENTION

1. Field of the Invention

This invention relates to a tour schedule processor for moving bodies, and more particularly to a tour schedule processor for processing a tour schedule involving transport activities especially performed by vehicles, driver's walking, and so on.

2. Description of the Prior Art

With the increasing sophistication of personal digital assistants (PDA) such as palm top computers, techniques have been proposed to enhance the exchange of data between a navigation system and a PDA.

Japanese Patent Laid-Open Publication No. Hei 5-289, 997 exemplifies a palm top computer adaptor, which is used for inputting destination data, stored in the palm top computer, into a navigation system, or for sending the navigation data to the palm top computer from the navigation system.

However, it is troublesome for the foregoing device to process a tour schedule which is concerned with a vehicle and a driver. For instance, each time the driver gets out of the vehicle and walks, the tour schedule related to the driver should be transferred to the palm top computer from a vehicle-installed navigation system, and the driver takes the palm top computer out of the vehicle.

SUMMARY OF THE INVENTION

The present invention is designed so as to overcome the foregoing problems of the prior art. For this purpose, there is provided a tour schedule processor which automates the transmission and reception of data between a portable data terminal such as a palm top computer and a vehicle-installed data terminal, and facilitates the execution of a tour schedule.

According to the invention, there is provided a tour schedule processor for processing tour schedules of moving bodies including a vehicle and a pedestrian. The schedule processor comprises a portable data terminal, and a vehicle-installed data terminal, a communication unit for communicating data between the portable data terminal and the vehicle-installed data terminal, a data selecting unit for selecting, from the tour schedule, a tour schedule related to the vehicle having the data terminal and a tour schedule related to moving bodies other than the vehicle, and storages disposed in the portable data terminal and in the vehicle-installed data terminal.

In this arrangement, the tour schedule related to the vehicle is stored in the storage of the vehicle-installed data terminal, and the tour schedule related to a moving body other than the vehicle (e.g. a driver) is stored in the storage means of the portable data terminal.

The tour schedule is automatically classified into vehicle-related data and data related to the driver. This relieves the driver of manually transferring the data from the portable data terminal to the vehicle-installed data terminal. Further, manual transmission of the data from the vehicle-installed data terminal to the portable data terminal is not necessary at the time of the driver's movement on foot.

The portable data terminal includes a receiver for receiving a tour schedule prepared by an information center, and transmits the received tour schedule to the vehicle-installed data terminal via the communication unit.

The data selecting unit of the vehicle-installed data terminal extracts data related to the vehicle from the tour schedule received from the portable data terminal, and stores the extracted data in the storage means of the vehicle-installed data terminal. The remaining data are transmitted to the portable data terminal via the communication unit.

The tour schedule processor further comprises a first navigating unit for guiding the vehicle in accordance with the tour schedule related to the vehicle, and a second navigating unit for guiding the driver in accordance with the driver-related tour schedule.

Both the first and second navigating units guide the vehicle and the driver in accordance with the overall tour schedule.

The vehicle-installed data terminal and the portable data terminal are essentially separate devices. However, when the driver moves by vehicle, the portable data terminal is fitted into its predetermined space within the vehicle. Thus, both data terminals are electrically connected, so that the portable data terminal will function as a vehicle-installed data terminal.

The invention will become more apparent from the following detailed description of the presently preferred embodiment when taken in conjunction with the accompanying drawings.

DESCRIPTION OF THE PREFERRED EMBODIMENT

Figure 1:
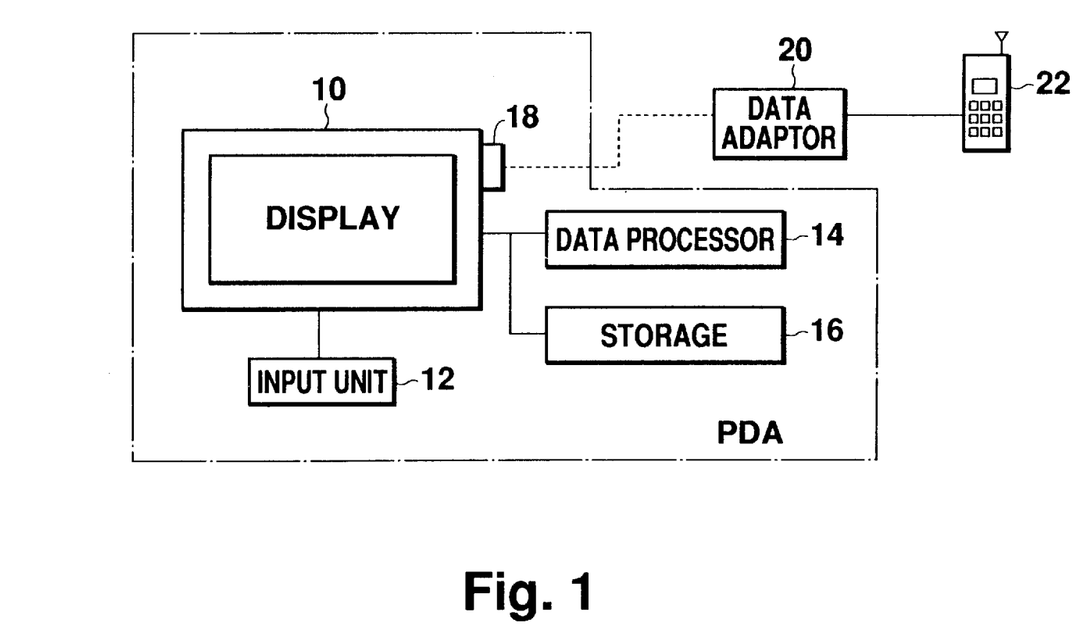
FIG. 1 is a block diagram showing the configuration of a personal digital assistant (PDA) according a preferred embodiment of the invention.

FIG. 1 shows the configuration of a PDA (personal digital assistant such as a palm top computer) according to an embodiment of the invention. The PDA comprises a display 10 (e.g. a liquid crystal display), an input unit 12, a data processor 14, a storage 16, and a communication unit 18. The input unit 12 is used, with a keyboard or an input pen, to enter data such as a destination, regions en route to the destination, and a desired time of arrival at the destination. The data processor 14 includes a CPU and a RAM, and controls the communication unit 18 so as to establish communications between the communication unit 18, an information center, and a vehicle-installed data terminal (to be described later). The storage 16 stores a tour schedule prepared by the information center, or a tour schedule prepared by the PDA. The PDA performs navigation guidance in accordance with the tour schedule stored in the storage 16. The communication unit 18 is connected to a portable telephone 22 via a data adaptor 20 or the like, and transmits and receives data to and from the vehicle-installed data terminal.

Figure 2:
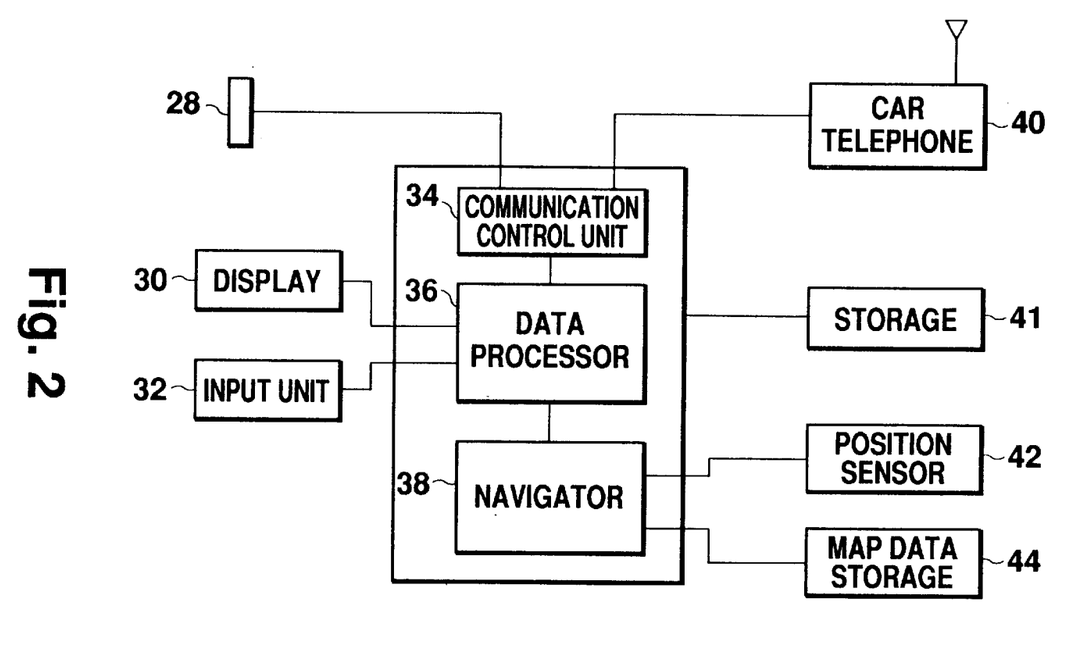
FIG. 2 is block diagram showing the configuration of a data terminal installed in a vehicle (called the "vehicle-installed data terminal)

The vehicle-installed data terminal is configured as shown in FIG. 2, and comprises a communication unit 28, a display 30, an input unit 32, a communication control unit 34, a data processor 36, a navigation unit 38, a data storage 41, a current position sensor 42 (such as a GPS, an engine speed sensor or an orientation sensor), and a map data storage 44 (e.g. a CD-ROM).

The communication unit 28 transmits and receives the data to and from the PDA. The communication control unit 34 controls communications between the PDA and the information center via a car telephone. The communication unit 28 is electrically connected to the communication unit 18 of the PDA so as to transfer the data therebetween. Alternatively, these communication units 28 and 18 transfer the data therebetween using light beams or electric waves. The display 30 is a CRT or a liquid crystal display. The display 10 of the PDA may also be used as the display 30. In such a case, the display 30 may be dispensed with. The input unit 32 includes a keyboard and a touch switch. The input unit 12 of the PDA may be usable as the input unit 32. The data processor 36 includes a CPU or a RAM, reads the tour schedule, classifies the read tour schedule into data related to the vehicle (called the "vehicle-related data") and those related to moving bodies other than the vehicle (i.e. the driver in this case), extracts the vehicle-related data, and stores the extracted data in the storage 41. The navigation unit 38 searches for preferable routes on the basis of the data stored in the storage 41 and the map data, proposes a recommended route on the display 30, and guides the vehicle along the recommended route on the basis of positional information detected by the current position sensor 42.

Figure 3:
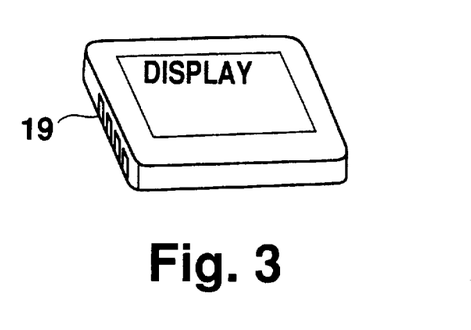
FIG. 3 shows an external appearance of the PDA.
Figure 4:
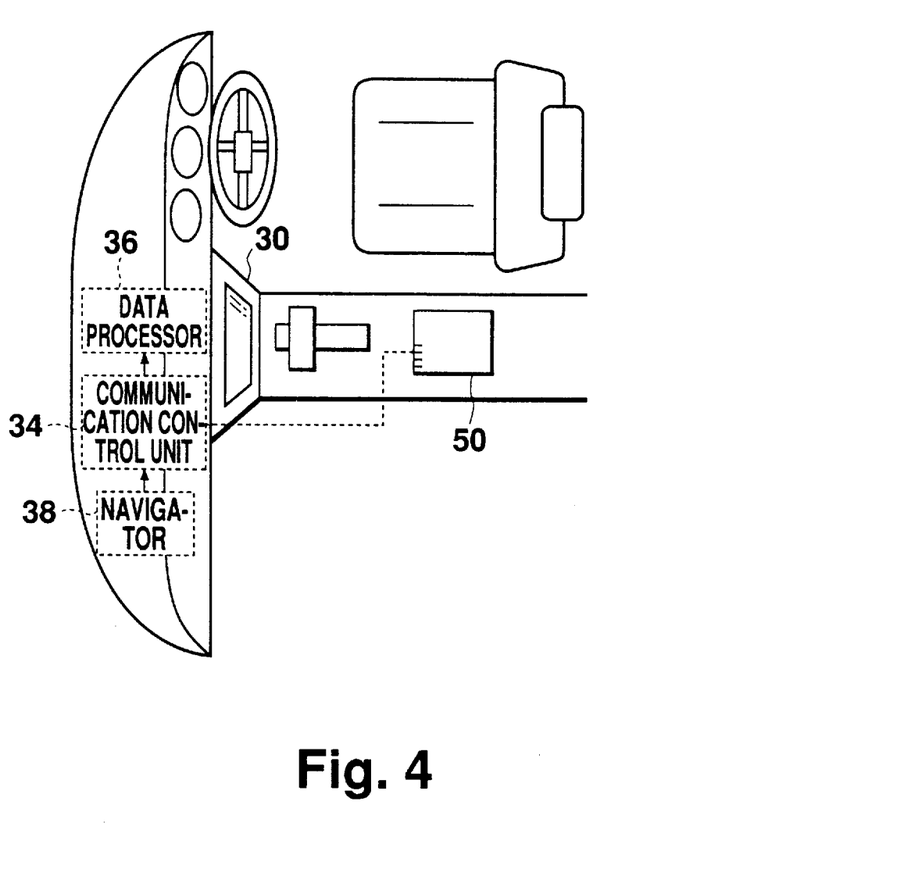
FIG. 4 is a schematic view of a center console of the vehicle and peripheral units.

The PDA is shaped as shown in FIG. 3, and is installed in the vehicle as shown in FIG. 4, which is a top view showing an area near a driver's seat in the vehicle. The PDA includes the display 10 on its upper surface, and a connector terminal 19 for connection with the vehicle, on a side thereof. In the vehicle, a center console has a recess 50 for receiving the PDA. Before driving the vehicle, the driver fits the PDA into the recess 50, so that the communication units 18 and 28 will be electrically connected via the connector terminal 19. This establishes data communications between the PDA and the vehicle-installed data terminal. Alternatively, the PDA and the vehicle-installed data terminal may be connected by a cable in place of the connector terminal 19.

Figure 5:
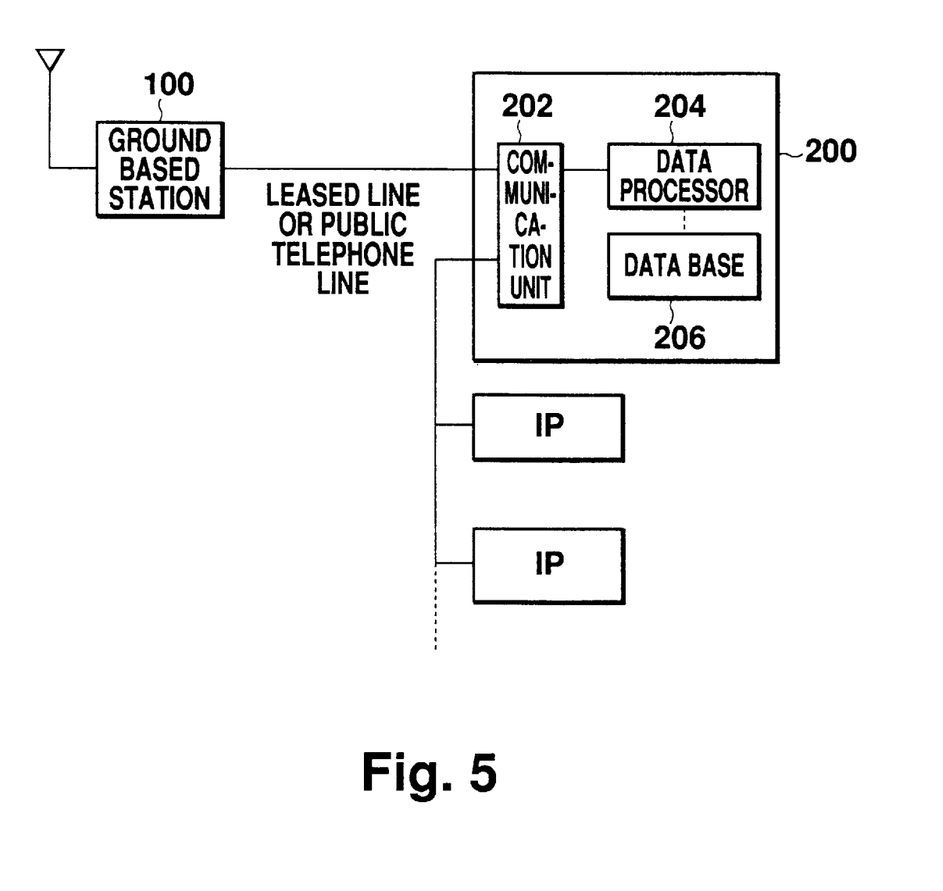
FIG. 5 is a block diagram showing the configuration of an information center.

The information center 200 for preparing the tour schedules is configured as shown in FIG. 5, and comprises a communication unit 202, a data processor 204, and a data base 206 for storing information concerning sightseeing and recreational facilities and so on and their positional data. Data sent via the portable telephone 22 or the car telephone 40 are transferred to the information center 200 via a ground-based station 100. The data processor 204 prepares a tour schedule on the basis of the inputted data concerning the destination, regions en route to the destination, and desired time of arrival at the destination, and provides the proposed tour schedule to the driver. Further, the data processor 204 gains access not only to the data base 206 but also to other information centers (IP) so as to obtain necessary information, and prepares a recommendable schedule using the obtained information.

Figure 6:
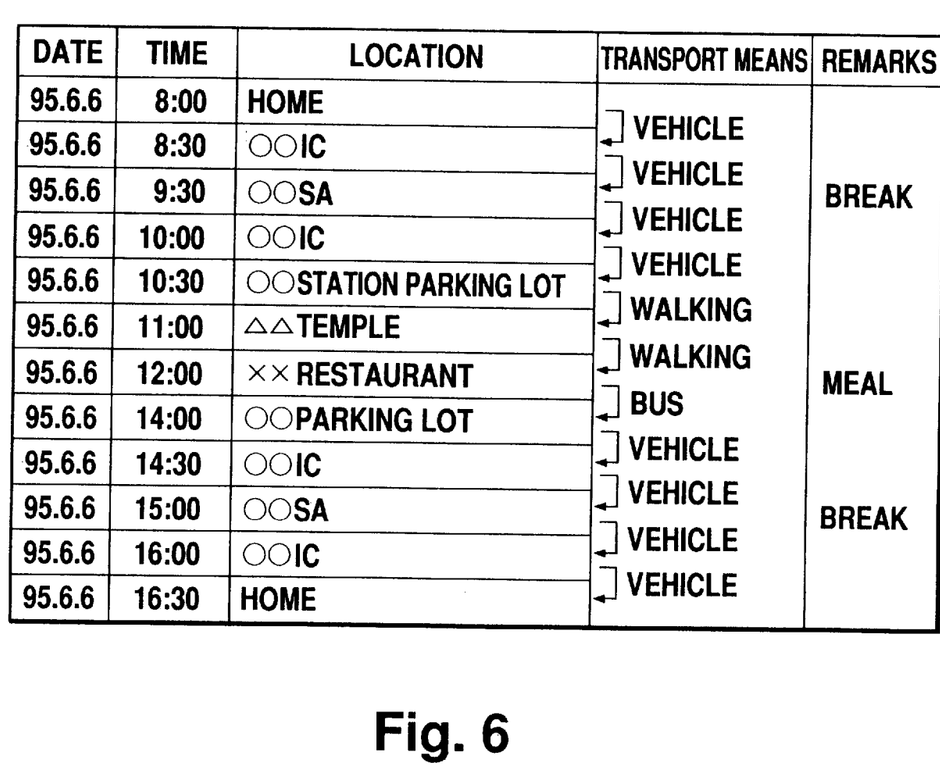
FIG. 6 shows one example of schedules.

FIG. 6 exemplifies a tour schedule prepared as described above. The tour schedule lists Date, Time, Location, and Transportation (e.g. by vehicle, by bus, or on foot), and is delivered to the PDA (or the vehicle-installed data terminal). The shown example indicates that the driver drives from his house to a railway station parking lot, walks to a temple and a restaurant from the parking lot, goes by bus from the restaurant to the parking lot, and drives back home from the parking lot. It is needles to say that data which are necessary to carry out the tour schedule, e.g. a map of the parking lot, routes to the temple, reservation for the restaurant, a time schedule of the bus, and so on, are delivered to the driver in addition to the foregoing tour schedule.

Three method are available for obtaining a tour schedule using the PDA. In a first method, the driver gains access to the information center using the portable telephone 22, and requests the information center to prepare a tour schedule, receives the proposed tour schedule from the information center, and stores it in the storage 16.

In a second method, the driver fits the PDA in the recess 50 of the center console of the vehicle, gains access to the information center via the car telephone 40 so as to request the information center to prepare a tour schedule, and receives the tour schedule from the information center via the vehicle-installed data terminal.

In a third method, the driver prepares a tour schedule using the PDA and retains it in the PDA. With the third method, the PDA should store map data and data concerning recreational facilities and so on, which means that large loads are applied to the PDA. On the contrary, the first and second methods are preferable in view of shortened length of processing time, because the driver can simply enter requirements and conditions via the input unit 12 so as to send them to the information center.

The following describes that tour guidance is offered in accordance with the tour schedule prepared by the foregoing first or second method.

Method 1

Figure 7:
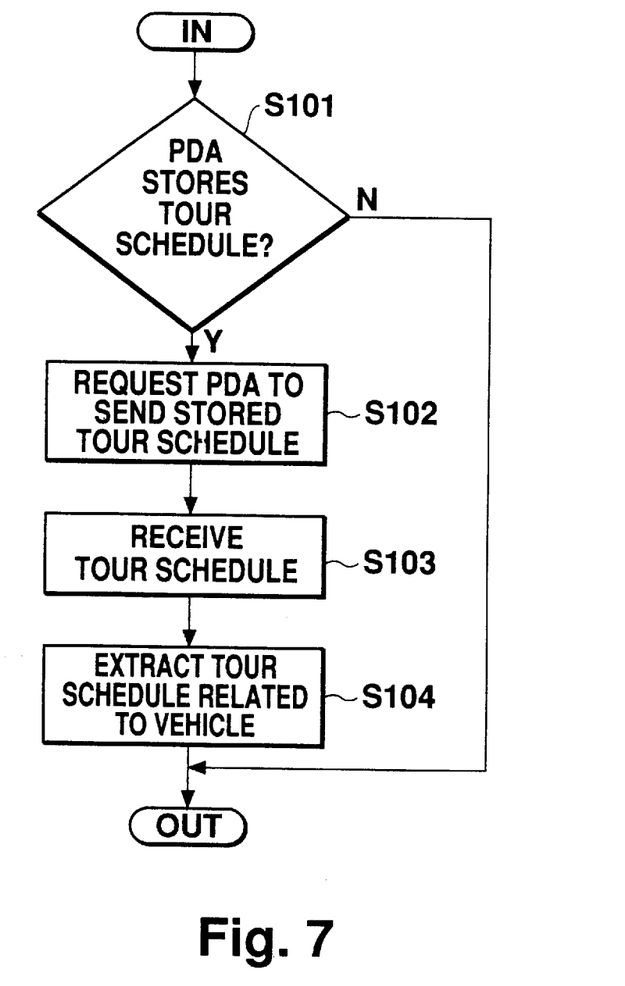
FIG. 7 is a flow chart showing the operation sequence of the vehicle-installed data terminal.
Figure 8:
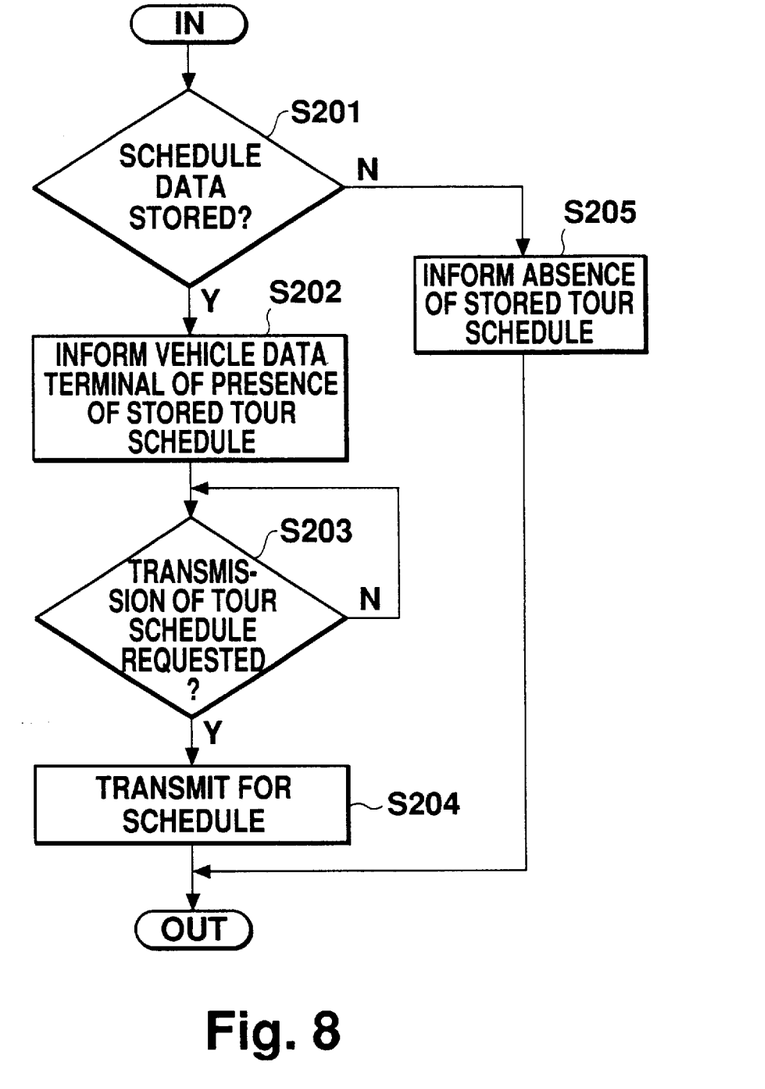
FIG. 8 is a flow chart showing the operation sequence of the PDA.

FIGS. 7 and 8 are flow charts showing the operation sequences of the PDA and the vehicle-installed data terminal in order to transmit and receive the data therebetween.

In the first method, the PDA transmits information, e.g. a destination, to the information center via the portable telephone 22, in accordance with the operation sequence shown in FIG. 7. The information center prepares a tour schedule on the basis of the received information, and delivers the tour schedule to the PDA. Receiving the tour schedule, the PDA stores it in the storage 16.

Initially, the storage 16 of the PDA stores the overall tour schedule including the vehicle-related data and data related to the driver's action (called the "driver-related data). In this state, the PDA is in the recess 50 of the vehicle, so that the PDA and the vehicle-installed data terminal are electrically interconnected via the communication unit 18, terminal 19 and communication terminal 28. Recognizing the electrical connection, the data processor 14 of the PDA informs the data processor 36 (in the vehicle-installed data terminal) of the tour schedule (steps S201 and S202 in FIG. 8). The data processor 36 recognizes that the PDA retains the tour schedule, and sends the PDA a signal requesting the transmission of the tour schedule (steps S101 and S102 in FIG. 7). In response to the request signal (step S203), the PDA transmits the tour schedule (stored in the storage 16) to the data processor 36 (step S204). The data processor 36 extracts vehicle-related data from the received tour schedule, and transmits the extracted data to the storage 41 (step S104 in FIG. 7). The data processor 36 extracts the vehicle-related data paying attention to the item "Transportation". Referring to FIG. 6, such data are related to the movement between the driver's house and the railway station parking lot, and the movement between the parking lot and the driver's house. Thus, the PDA stores the whole tour schedule, while the vehicle-installed data terminal stores only the vehicle-related data. Alternatively, since the PDA does not have to store the vehicle-related data, the data processor 14 transmits the tour schedule to the vehicle-installed data terminal, and then reads the tour schedule stored in the storage 16, deletes the vehicle-related data, and stores the remaining data in the storage 16.

The vehicle-related data is automatically stored in the vehicle-installed data terminal simply by fitting the PDA into the recess 50, and the other data are stored in the PDA. Then, the PDA and the vehicle-installed data terminal perform the navigation guidance on the basis of the stored data.

Figure 9:
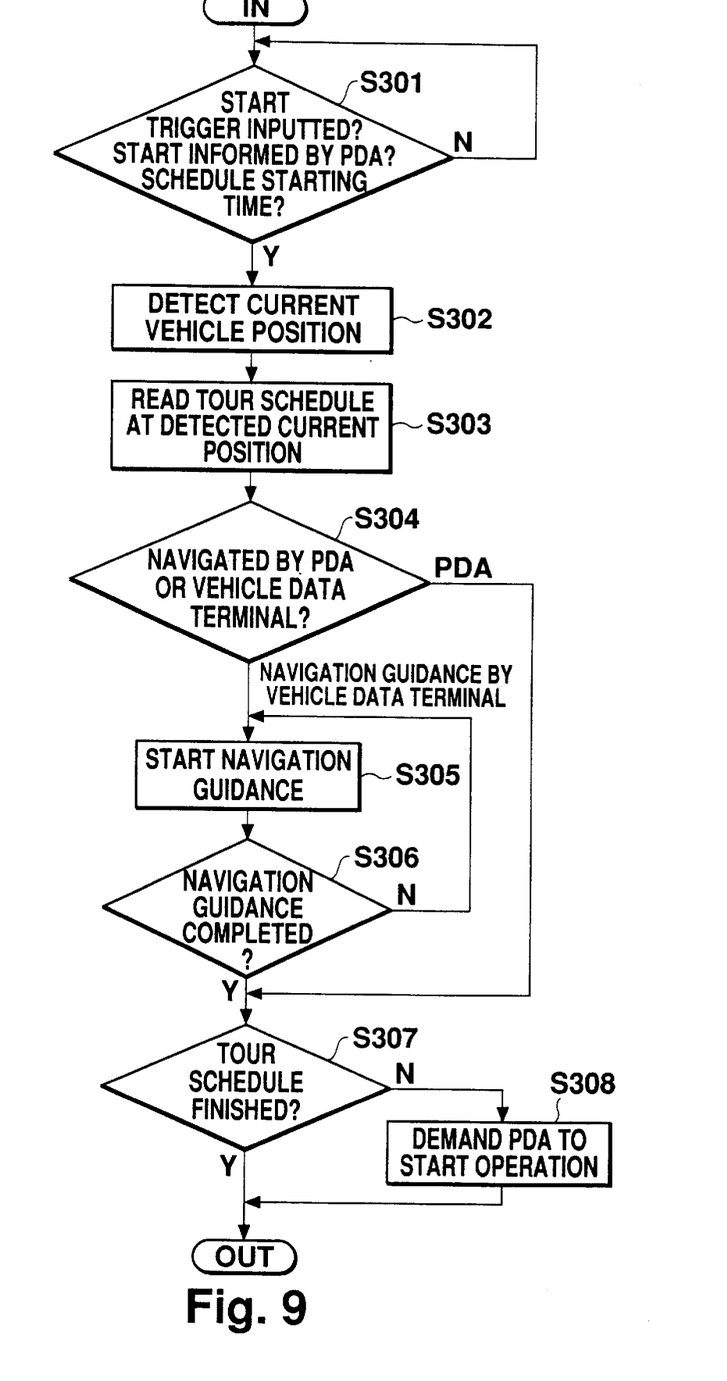
FIG. 9 is a flow chart showing the navigation sequence executed by the vehicle-installed data terminal.
Figure 10:
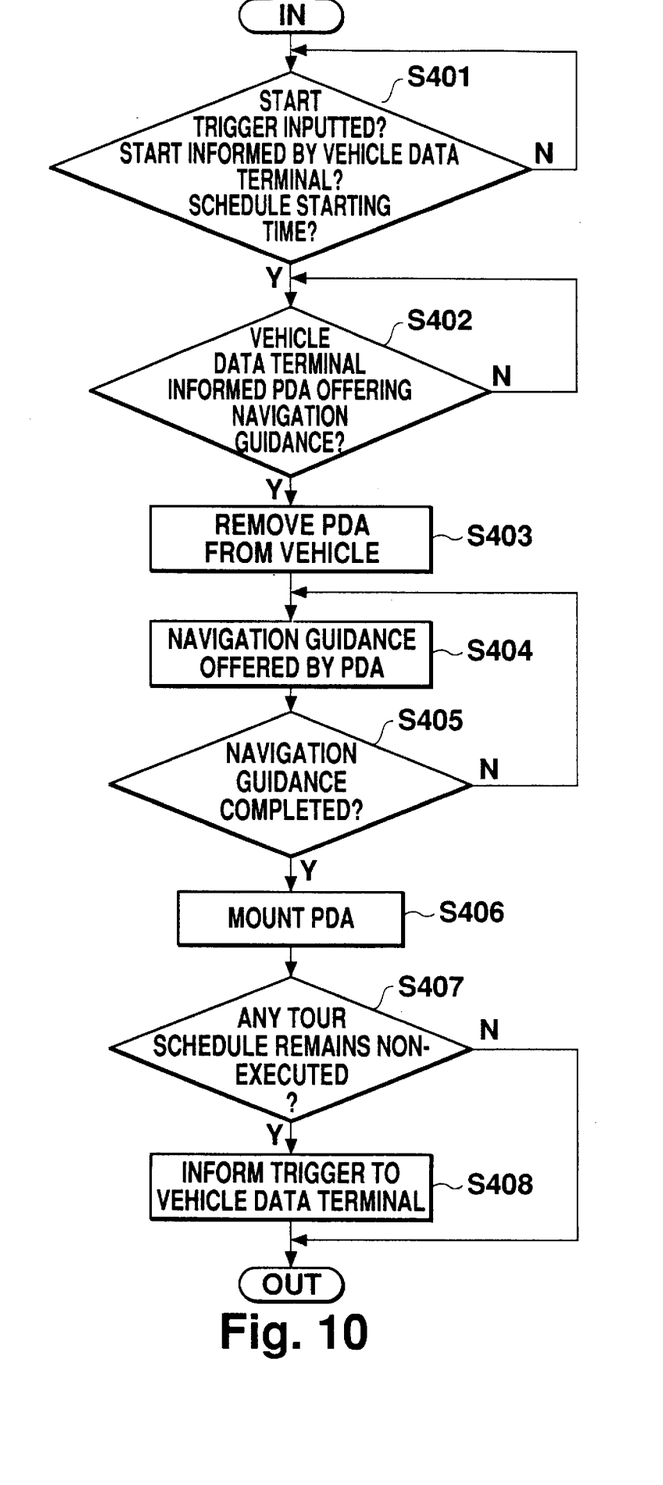
FIG. 10 is flow chart showing the navigation sequence executed by the PDA.

FIGS. 9 and 10 are the flow charts showing the navigation sequences carried out by the PDA and the vehicle-installed data terminal, respectively.

In the vehicle-installed data terminal, the data processor 36 checks whether or not a start trigger is inputted from the input unit 32, whether or not the data processor 14 of the PDA informs the start in response to a start signal from the input unit 12, or whether or not it is time to start the vehicle-related tour schedule stored in the storage 41 (step S301). When any of the foregoing conditions is satisfied, a current position of the vehicle is detected on the basis of a detection signal from the current position sensor 42 such as a GPS (step S302). The vehicle-installed data processor 36 reads the tour schedule corresponding to the detected current position, from the data stored in the storage 41 (step S303), and determines whether or not the read tour schedule relates to the vehicle or the moving bodies other than the vehicle, i.e. whether the navigation guidance is offered by the vehicle-installed data terminal or by the PDA (S304). The storage 41 generally stores the tour schedule related to the vehicle. The presence of the tour schedule in the storage 41 represents the navigation guidance to be offered by the vehicle-installed data terminal. In other words, the absence of the tour schedule therein represents that the navigation guidance is performed via the PDA. Referring to FIG. 6, the tour schedule indicates that the driver moves by vehicle. Thus, if the current position is identified to be the driver's house when the start trigger is inputted first of all or when the time is recognized as being 8:00, the navigation guidance will be offered by the vehicle-installed data terminal.

In this case, the navigation unit 38 guides the vehicle on the basis of the data stored in the storage 41 as well as the map data, i.e. the navigation unit 38 searches, using the well-known Dijkstra technique or the like, for a preferable route to the destination (the parking lot) by way of transportation facilities specified in the schedule (such as interchanges and service areas). The navigation unit 38 indicates the searched route on the display 30, thereby guiding the vehicle (step S305). The navigation unit 38 may also verbally guide the vehicle in addition to a conventional navigation technique such as indicating the route with an arrow mark.

The navigation guidance by the vehicle-installed data terminal will be finished when the vehicle arrives at the destination. Specifically, when detecting the arrival of the vehicle at the parking lot (step S306), the navigation unit 38 informs this to the data processor 36. In response to the information, the data processor 36 checks whether or not the overall tour schedule is completed (step S307), i.e. whether or not the current position of the vehicle agrees with the final destination. The tour schedule of FIG. 6 lists the driver's house as the final destination. Thus, the data processor 36 recognizes that the overall tour schedule is not completed since the vehicle is currently at the parking lot. In the tour schedule, the next movement is performed by the driver, i.e. the driver walks. Since the PDA retains the data related to the driver's activities, the data processor 36 informs the data processor 14 of the PDA to urge the driver to walk (step S308). On the other hand, when the schedule is recognized as being completed, the navigation unit 38 finishes its operation, and indicates this on the display 30. Further, if the driver walks to the final destination, the storage 41 does not store the data on the final destination. In this case, it is necessary for the driver to get access to the PDA and check whether the current position is the final destination. Needless to say, it is possible to store the final destination in the storage 41 as well as the vehicle-related tour schedule when the data processor 36 receives the tour schedule from the PDA.

When it is recognized that the guidance should be offered by the PDA (step S304), the navigation unit 38 does not operate. In this case, it is checked whether or not the overall tour schedule is completed (step S307). If the overall schedule is not completed, the vehicle-installed data terminal demands to start the PDA (step S308).

The foregoing describes the processing performed by the vehicle-installed data terminal. The PDA operates in accordance with the sequence shown in FIG. 10. In the PDA, the data processor 14 checks whether or not the start trigger is inputted, whether or not the vehicle-installed data terminal informs the start of the schedule, or whether or not it is time to start the tour schedule (step S401). When any of the foregoing conditions is satisfied, the data processor 14 checks whether or not the vehicle-installed data terminal has informed that the tour schedule should be performed by the PDA (step S402). As described previously, when the current position suggests the transportation other than the vehicle, the data processor 36 of the vehicle-installed data terminal requests the PDA to perform the guidance (step S308). Thus, the PDA performs the guidance. The data processor 14 as a second navigation unit indicates necessary data on the display 10. The guidance will be initiated after the driver removes the PDA from the center console of the vehicle so as to carry it (step S403). According to the tour schedule in FIG. 6, the driver walks to the temple and the restaurant from the parking lot. The data processor 14 reads data from the storage 16, and displays a route to the temple from the parking lot, lists a menu of the restaurant, a time schedule of a bus between the restaurant and a railway station, and so on. However, since the PDA does not have the current position sensor, the driver changes a guidance screen display by operating a touch switch "Next" on the display. When the guidance by the PDA is completed, the driver returns to the vehicle, and fits the PDA into the recess 50 on the center console of the vehicle (step S406). When detecting the electrical connection with the vehicle-installed data terminal, the data processor 14 checks whether or not any non-executed portion of the tour schedule remains (step S407). In the tour schedule shown in FIG. 6, a non-executed portion of the schedule remains, i.e. the movement from the parking lot to the driver's house. Thus, the data processor 14 informs this to the data processor 36 of the vehicle-installed data terminal (step S408). In response to the information, the data processor 36 executes the procedures in steps S301 to S307, thereby guiding the vehicle to the final destination.

Figure 11A:
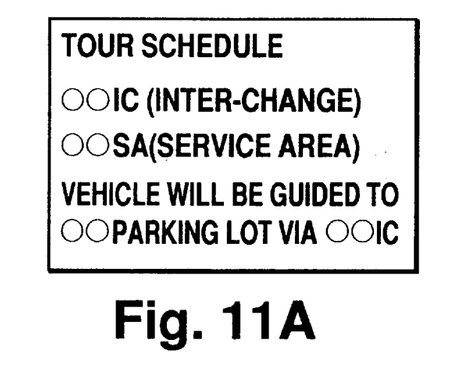
FIG. 11A shows an example of a screen display indicating an initial state.
Figure 11B:
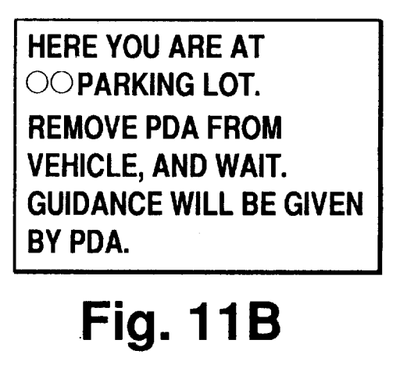
FIG. 11B shows an example of the screen display indicating the end of navigation guidance.
Figure 11C:
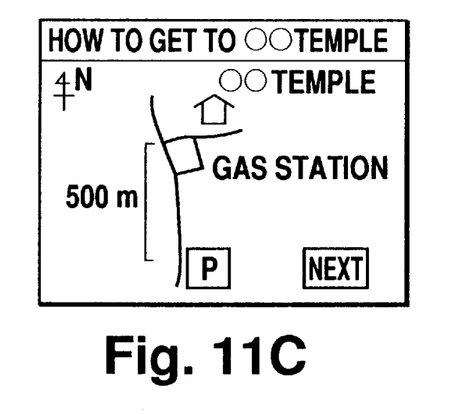
FIG. 11C shows an example of a screen display indicating guidance by the PDA.
Figure 11D:
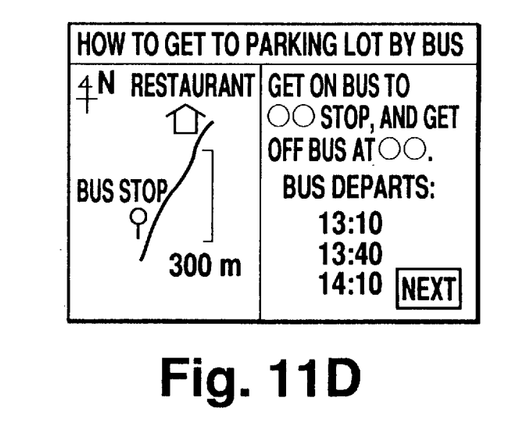
FIG. 11D shows an example of the screen display indicating another guidance by the PDA.

FIGS. 11A to 11D schematically show guidance screen displays offered on the displays 10 and 30. The screen display in FIG. 11A shows the initial state after the PDA is mounted in the vehicle and the data processor 36 extracts the vehicle-related data, First of all, this screen display is offered so as to inform the driver of the vehicle guidance to the railway station parking lot prior to the navigation guidance by the vehicle-installed data terminal in step S305. After the vehicle has been guided to the parking lot, the screen display shown in FIG. 11B is offered to urge the driver to remove and carry the PDA (step S308). Then, the data processor 14 enables the screen displays in FIGS. 11C and 11D to be offered, so that the driver will be guided from and to the parking lot via the temple and the restaurant (step S404).

In the first method, the vehicle-related data in the tour schedule are transferred to the vehicle-installed terminal. The vehicle-installed data terminal guides the vehicle during the tour using the vehicle. As soon as the guidance by the vehicle-installed data terminal is completed, the guidance will be automatically taken over by the PDA. Thus, the driver is relieved from transferring the data between the vehicle-installed data terminal and the PDA each time the navigation guidance is completed. This enable the vehicle to reach the destination without any problem.

Method 2

In the second method, the PDA is fitted into the recess 50, and the driver gains access to the information center using the car telephone 40, and requests it to prepare a tour schedule. The prepared tour schedule will be delivered to the vehicle-installed data terminal from the information center. The second method differs from the first method in that the tour schedule is delivered via the vehicle-installed data terminal. Thus, the vehicle-installed data terminal can monitor the contents of the tour schedule from the information center and extract vehicle-related data, and transmit the remaining data to the PDA. Contrary to the first method, the second method is advantageous since it is not necessary to temporarily retain the overall tour schedule in the PDA and to transfer the vehicle-related data to the vehicle-installed data terminal. Specifically, the data processor 14 transmits the conditions inputted by the input unit 12 to the information center, using the car telephone 40. The information center delivers the prepared tour schedule to the data processor 36, which extracts the vehicle-related data and stores them in the storage 41, and transfers the remaining data to the data processor 14 via the communication units 28 and 18. The data processor 14 stores the received data in the storage 16. Thus, the vehicle-installed data terminal retains the vehicle-related data while the PDA retains the data related to the driver. The succeeding navigation guidance will be offered in the same manner as that in the first method.

According to the second method, the vehicle-installed data terminal can continuously monitor the tour schedule prepared by the information center. Even when it is forced to modify or change the tour schedule, prepared by the first or second method, the second method can advantageously cope with such a situation without time loss. In other words, when the information center recognizes that the tour schedule cannot be executed due to varying traffic conditions (e.g. when the proposed route cannot be used due to a traffic accident). This will be informed to the PDA. In response to the information, the data processor 36 acquires vehicle-related data if there is any, and changes the passing points and so on. For instance, if a highway suffers from heavy traffic due to an accident, the data processor 36 sends the PDA data for changing the passing points to the parking lot. Since the vehicle is to be used to get to the parking lot from the driver's house according to the tour schedule, the data processor 36 obtains the vehicle-related data, and re-searches for a preferable route from the driver's house to the parking lot so as to guide the vehicle.

Figure 12:
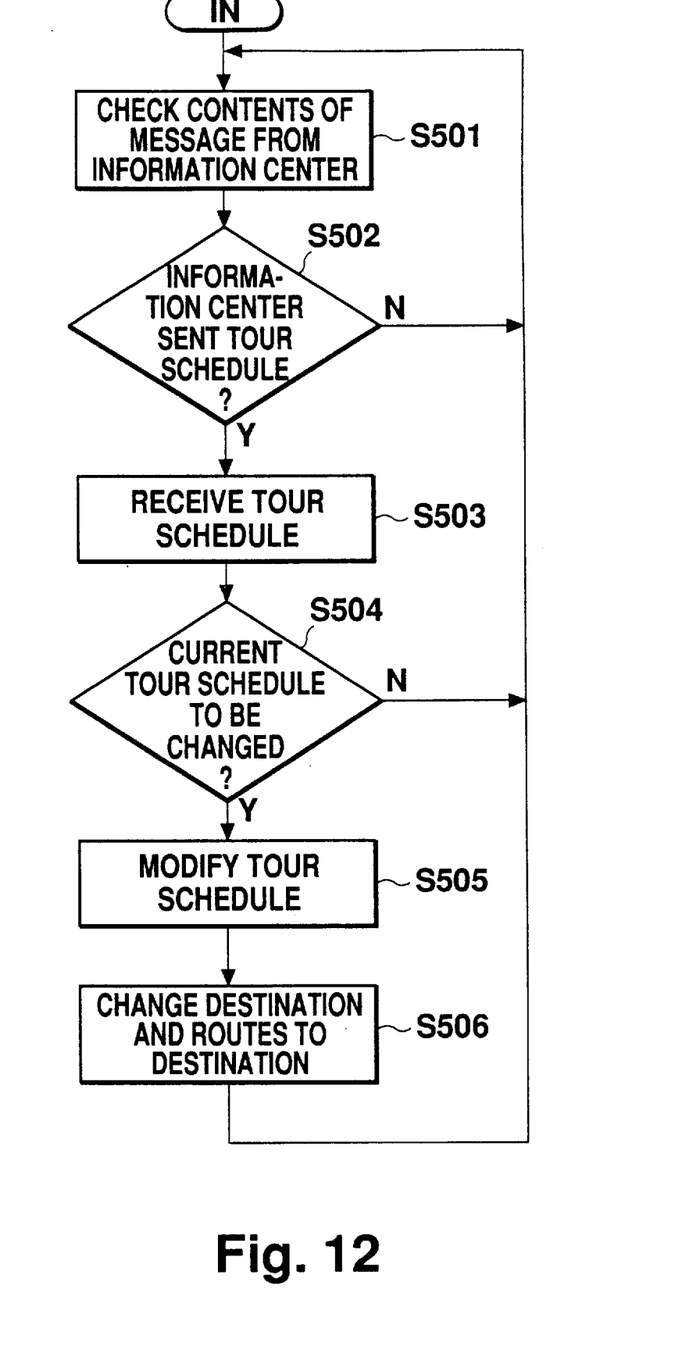
FIG. 12 is a flow chart showing the operation sequences of another navigation guidance performed by the vehicle-installed data terminal.

FIG. 12 is a flow chart showing the operation sequence of the data processor 36 in the vehicle-installed data terminal. First of all, the data processor 36 checks the communication data from the information center (step S501), and determines whether or not the communication data are related to the tour schedule (step S502). This determination is performed by identifying a type of data in a header of the communication data. If the communication data are not related to the tour schedule, i.e. it is simply electronic mail to the PDA from the information center, the data processor 36 does not process the communication data, but transfers them to the PDA. Conversely, when the communication data are related to the tour schedule, the data processor 36 receives the tour schedule data (step S503), and checks whether or not the existing tour schedule should be modified (step S504). If the tour schedule contains the vehicle-related data which require modification, the data stored in the storage 41 are updated, thereby modifying the tour schedule (step S505) with respect to the passing points and the destination (step S506). The remaining tour schedule related to the moving bodies other than the vehicle is sent to the PDA as it is. The data processor 14 in the PDA modifies the tour schedule in accordance with the modified contents. Thus, the driver does not have to transfer the modified data from the PDA to the vehicle-installed data terminal, which enables the tour schedule processor to quickly cope with the modified tour schedule.

With the present invention, the vehicle-installed data terminal besides the PDA can gain access to the information center, ask the information center to prepare a tour schedule, and receive the prepared tour schedule therefrom. In such a case, the tour schedule is temporarily stored in the storage 41 of the vehicle-installed data terminal. When the PDA is fitted into the recess 50 of the vehicle, the data processor 36 recognizes this, and transfers to the PDA the data related to the moving bodies other than the vehicle. This enables the tour schedule to be shared by the vehicle-installed data terminal and the PDA depending upon the contents thereof.

The tour schedule processor of the invention automates the transfer of the data between the vehicle-installed data terminal and the PDA, which facilitates the execution of the tour. Especially, even when the transportation means is changed, the driver's assistance will be dispensed with, which means the route guidance will be offered without interruption, thereby enabling the vehicle to reach the destination without trouble.

What is claimed is:

1. A tour schedule processor for processing tour schedules of moving bodies including a vehicle and a pedestrian, comprising:

(a) a portable data terminal and a vehicle-installed data terminal;

(b) communication means for communicating data between the portable data terminal and the vehicle-installed data terminal;

(c) data selecting means for selecting, from the tour schedule, tour schedule related to the vehicle having the data terminal and tour schedule related to moving bodies other than the vehicle; and (d) storage means disposed in the portable data terminal and in the vehicle-installed data terminal, and both the storage means storing the tour schedule;

wherein the tour schedule related to the vehicle is stored in the storage means of the vehicle-installed data terminal, and the tour schedule related to the moving bodies other than the vehicle is stored in the storage means of the portable data terminal.

2. The tour schedule processor according to claim 1, wherein the portable data terminal includes receiving means for receiving a tour schedule prepared by an information center, and transmitting the received tour schedule to the vehicle-installed data terminal via the communication means.

3. The tour schedule processor according to claim 2, wherein the data selecting means of the vehicle-installed data terminal selects the tour schedule related to the vehicle from the tour schedule transmitted from the portable data terminal, and stores the selected data in the storage means of the vehicle-installed data terminal.

4. The tour schedule processor according to claim 1, wherein the vehicle-installed data terminal includes receiving means for receiving the tour schedule prepared by an information center, and the selecting means of the vehicle-installed data terminal selects the tour schedule related to the vehicle from the received tour schedule, and stores the selected data in the storage means of the vehicle-installed data terminal.

5. The tour schedule processor according to claim 4, wherein the tour schedule related to the moving bodies other than the vehicle is transmitted to the portable data terminal via the communication means, and is stored in the storage means of the portable data terminal.

6. The tour schedule processor according to claim 1, further comprising:

(e) first navigating means for guiding the vehicle in accordance with the tour schedule related to the vehicle; and (f) second navigating means for guiding the moving bodies other than the vehicle in accordance with the tour schedule related to the moving bodies other than the vehicle, wherein both the first and second navigating means execute the overall tour schedule.

7. The tour schedule processor according to claim 6, further comprising:

(g) first informing means disposed in the vehicle-installed data terminal and informing the portable data terminal of the completion of navigation guidance by the first navigating means via the communication means; and (h) second informing means disposed in the portable data terminal and informing the vehicle-installed data terminal of the completion of the guidance by the second navigating means, wherein the second navigating means is activated in response to the information from the first informing means, and the first navigating means is activated in response to the information from the second informing means.

8. The tour schedule processor according to claim 1, wherein the portable data terminal has a connector terminal for electrical connection with the vehicle-installed data terminal, and the electrical connection between the portable data terminal and the vehicle-installed data terminal is established via the connector terminal when the portable data terminal is fitted into a predetermined position in the vehicle.

9. The tour schedule processor according to claim 8, wherein the portable data terminal has information displaying means for displaying information, and the information displaying means functions as a display for the vehicle-installed data terminal when the portable data terminal and the vehicle-installed data terminal are electrically connected.

* * * * *

UNITED STATES PATENT AND TRADEMARK OFFICE
CERTIFICATE OF CORRECTION

PATENT NO.      : 5,819,227

DATED           : October 6, 1998

INVENTOR(S)     : OBUCHI, Masashi

It is certified that error appears in the above-identified patent and that said Letters Patent is hereby corrected as shown below:

On the title page: Item

--[30] Foreign application priority data

August 24, 1995     (JP) Japan     07-215569--.

Signed and Sealed this

Seventh Day of December, 1999

Attest:

Q. TODD DICKINSON

*Attesting Officer*     *Acting Commissioner of Patents and Trademarks*